United States Patent
Fukushima

(10) Patent No.: US 12,266,038 B2
(45) Date of Patent: Apr. 1, 2025

(54) IMAGE PROCESSING APPARATUS AUTOMATICALLY CREATING LAYOUT OF COMBINATION IMAGE FROM IMAGE GROUP, IMAGE PROCESSING METHOD, PROGRAM, AND RECORDING MEDIUM

(71) Applicant: FUJIFILM Corporation, Tokyo (JP)

(72) Inventor: Toshimitsu Fukushima, Tokyo (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 17/331,969

(22) Filed: May 27, 2021

(65) Prior Publication Data

US 2021/0407161 A1  Dec. 30, 2021

(30) Foreign Application Priority Data

Jun. 24, 2020 (JP) .................................. 2020-108624

(51) Int. Cl.
*G06F 3/0484* (2022.01)
*G06F 3/04842* (2022.01)
(Continued)

(52) U.S. Cl.
CPC .......... *G06T 11/60* (2013.01); *G06F 3/04842* (2013.01); *G06F 3/04845* (2013.01)

(58) Field of Classification Search
CPC .. G06T 11/60; G06F 3/04842; G06F 3/04845; G06F 16/54; G06F 3/0483;
(Continued)

(56) References Cited

U.S. PATENT DOCUMENTS

| 8,935,322 B1 * | 1/2015 | Grosz ..................... G06F 16/50 709/203 |
| 10,341,508 B2 | 7/2019 | Hayakawa |

(Continued)

FOREIGN PATENT DOCUMENTS

| CN | 106127687 A | * 11/2016 | ............... G06T 3/40 |
| CN | 109189293 B | * 11/2021 | ........... G06F 3/0483 |

(Continued)

OTHER PUBLICATIONS

An Office Action; "Notice of Reasons for Refusal," mailed by the Japanese Patent Office on Jul. 25, 2023, which corresponds to Japanese Patent Application No. 2020-108624 and is related to U.S. Appl. No. 17/331,969; with English language translation.

*Primary Examiner* — Tuyetlien T Tran
*Assistant Examiner* — Samuel Shen
(74) *Attorney, Agent, or Firm* — Studebaker Brackett PLLC

(57) ABSTRACT

There are provided an image processing apparatus, an image processing method, a program, and a recording medium capable of seamlessly restarting editing of a layout even in a case where a device is changed from a terminal device of a user having an image group to a terminal device of the user not having the image group.
In the image processing apparatus, the image processing method, the program, and the recording medium, a combination image of which a layout is created is displayed on a first terminal device, candidate images available for the combination image in a case where editing of the layout is restarted on a second terminal device are selected from an image group based on a predetermined reference while the layout is being edited on the first terminal device, the candidate images being some images other than use images being in use for the combination image, and the use images, the candidate images, and an additional image which is (Continued)

newly added to the combination image from the image group other than the use images by editing the layout on the first terminal device, which are transmitted from the first terminal device and received by a server are stored in the server.

13 Claims, 7 Drawing Sheets

(51) Int. Cl.
    *G06F 3/04845*     (2022.01)
    *G06T 11/60*     (2006.01)
    *H04L 29/08*     (2006.01)

(58) Field of Classification Search
    CPC ........ G06F 16/55; G06F 16/583; G06F 9/451; H04L 67/06
    See application file for complete search history.

(56) References Cited

U.S. PATENT DOCUMENTS

| | | | |
|---|---|---|---|
| 10,999,454 B2 | 5/2021 | Hayakawa | |
| 11,178,291 B2 | 11/2021 | Ikuta | |
| 11,348,295 B2 * | 5/2022 | Takeyama | G06F 3/1292 |
| 11,416,121 B2 * | 8/2022 | Fukushima | G06T 11/00 |
| 2014/0307980 A1 * | 10/2014 | Hilt | G06T 11/60 |
| | | | 382/284 |
| 2016/0042249 A1 * | 2/2016 | Babenko | G06V 20/46 |
| | | | 382/224 |
| 2016/0156874 A1 * | 6/2016 | Rajagopalan | H04L 67/125 |
| | | | 348/207.1 |
| 2020/0076963 A1 | 3/2020 | Ishida | |
| 2020/0150832 A1 * | 5/2020 | Winn | A61K 39/39566 |
| 2020/0311997 A1 * | 10/2020 | Takeyama | H04N 1/00196 |
| 2021/0271352 A1 * | 9/2021 | Fukushima | G06T 11/00 |
| 2021/0357682 A1 * | 11/2021 | Route | G06F 18/2155 |

FOREIGN PATENT DOCUMENTS

| | | | | |
|---|---|---|---|---|
| JP | 2004172825 A | * | 6/2004 | |
| JP | 2005-196613 A | | 7/2005 | |
| JP | 2006-072824 A | | 3/2006 | |
| JP | 2007194966 A | | 8/2007 | |
| JP | 2011109424 A | * | 6/2011 | |
| JP | 2017-117402 A | | 6/2017 | |
| JP | 2019067237 A | | 4/2019 | |
| JP | 6521856 B2 | | 5/2019 | |
| JP | 2019128647 A | | 8/2019 | |
| JP | 2020-036237 A | | 3/2020 | |
| WO | WO-2018000818 A1 | * | 1/2018 | ............ G06T 3/40 |
| WO | 2019/155852 A1 | | 8/2019 | |

\* cited by examiner

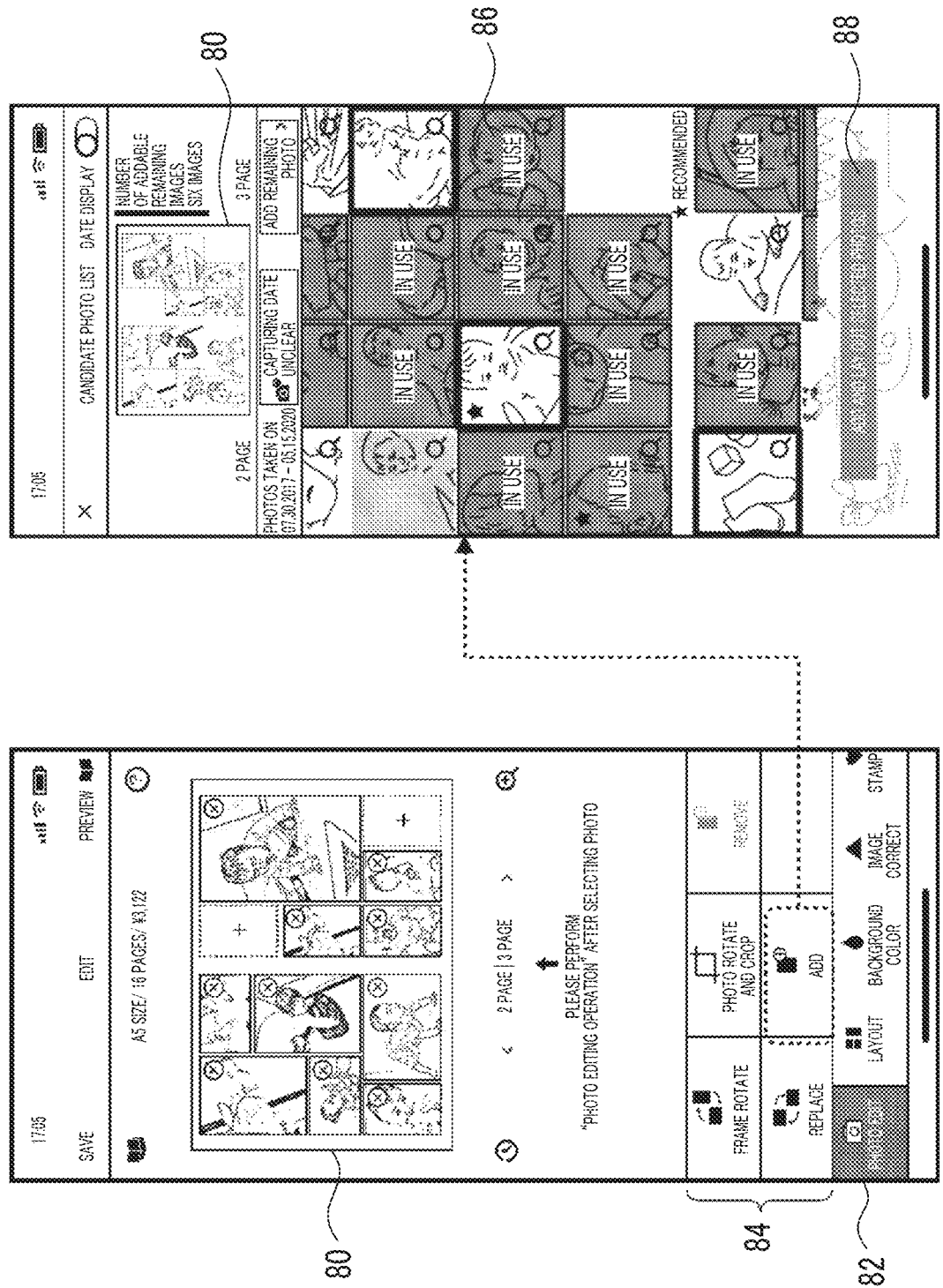

IMAGE PROCESSING APPARATUS AUTOMATICALLY CREATING LAYOUT OF COMBINATION IMAGE FROM IMAGE GROUP, IMAGE PROCESSING METHOD, PROGRAM, AND RECORDING MEDIUM

CROSS-REFERENCE TO RELATED APPLICATIONS

The present application claims priority under 35 U.S.C. § 119 to Japanese Patent Application No. 2020-108624, filed on Jun. 24, 2020. The above application is hereby expressly incorporated by reference, in its entirety, into the present application.

BACKGROUND OF THE INVENTION

1. Field of the Invention

The present invention relates to an image processing apparatus, an image processing method, a program, and a recording medium that automatically create a layout of a combination image from an image group.

2. Description of the Related Art

In a case where a layout of a combination image of a photo album (photobook), a hard cover album, a shuffle print, and the like is created, it is necessary for a user to perform a time-consuming editing work of selecting a plurality of images to be used for the combination image from among a large number of images included in an image group of the user and laying out the plurality of selected images neatly, and this editing work is a heavy burden for a beginner.

In view of such a situation, an application that automatically selects a plurality of images to be used for a combination image from an image group of a user and automatically creates a layout of the combination image by using the plurality of selected images, such as an ordering application (ordering software) for a combination image that operates on a terminal device of the user such as a personal computer (PC), a tablet PC, or a smartphone, is provided.

Here, the related arts related to the present invention include JP2007-194966A, JP2019-067237A, W652185613, and JP2019-128647A.

JP2007-194966A describes an album creation system in which low-quality images are generated from high-quality images and supplied to an album creation device on an album orderer terminal, an album sample is created by analyzing the low-quality images, selecting low-quality images to be arranged on an album from among the low-quality images, and arranging the selected images on the album and the album sample is transmitted to the album orderer terminal on the album creation device, and the transmitted album sample is browsed to the user.

JP2019-067237A describes an information processing apparatus that receives the size and the number of pages of an album from a user, accepts designation of image files, analyzes and scores the image files, classifies a plurality of image files into a plurality of groups, selects images having high scores from the group, lays out image data included in each group in each region of a template, displays a confirmation and editing screen of a layout result of the album, and transmits album data at a current point in time to an external server via a network in a case where a confirmation and editing work is ended.

JP6521856B describes an information processing apparatus that scores image files, creates a layout list including a plurality of layouts, and allows a user to execute an editing work of a laid-out album. JP6521856B describes that, among the image files not used in the layout list, image files of which evaluation values of the scores are equal to or greater than a predetermined value or a predetermined number of image files of which the evaluation values are higher are remained without being deleted, and the layout list is created including the remaining images without being deleted in a case where the editing is performed again.

JP2019-123647A describes a photobook creation device that stores a page deletion image in a case where a page deletion image due to a layout change is present and displays a list of page arrangement candidate images in a state in which the page deletion image is emphasized and displayed in a case where an edited page on which images are already arranged is displayed as an editing page.

SUMMARY OF THE INVENTION

In the related art, on the terminal device of the user, the layout of the combination image is created from the image group by using the ordering application, the images being in use for the combination image and the information on the created layout are transmitted to the server, and a product of the combination image is ordered. In this case, since the images that are not used for the combination image in the image group are stored only in the terminal device of the user who creates the combination image, there is a problem that the editing of the layout such as adding of a new image from the image group to the combination image can be restarted only by this terminal device of the user, for example.

On the other hand, even though the device is changed to the terminal device of the user not having the image group from the terminal device of the user having the image group, in a case where it is possible to realize an environment in which the editing work of the layout can be restarted seamlessly, the convenience of a user such as a mother having a young child who has a limited editing time is improved. However, in this case, there is another problem that the user is forced to wait for until all the image groups available for the combination image are transmitted from the terminal device of the user to the server.

A first object of the present invention is to provide an image processing apparatus, an image processing method, a program, and a recording medium capable of seamlessly restarting editing of a layout even in a case where a device is changed from a terminal device of a user having an image group to a terminal device of the user not having the image group.

In addition to the first object, a second object of the present invention is to provide an image processing apparatus, an image processing method, a program, and a recording medium capable of significantly reducing a waiting time of a user until an image group available for a combination image is transmitted from a terminal device of the user to a server.

In order to achieve the objects, the present invention is an image processing apparatus that includes a server, a first terminal device, and a second terminal device different from the first terminal device which are connected via a network, and creates a layout of a combination image by using some images selected from an image group of the first terminal device. The image processing apparatus includes a processor. The processor is configured to display the combination image of which the layout, is created on the first terminal device, select candidate images available for the combination image in a ease where editing of the layout is restarted on the second terminal device from the image group based on a predetermined reference while the layout is being edited on the first terminal device, the candidate images being some images other than use images being in use for the combination image and store, in the server, the use images, the candidate images, and an additional image which is newly added to the combination image from the image group other than the use images by editing the layout on the first terminal device, which are transmitted from the first terminal device and received by the server.

Here, it is preferable that the processor is configured to create, from the image group, art image group for analysis which has a resolution required for analyzing the image group and has a smaller amount of data than the image group on the first terminal device, analyze the image group for analysis transmitted from the first terminal device and received by the server, select use images for analysis based on an analysis result of the image group for analysis from the image group for analysis, create the layout by using the use image for analysis, store information on the layout on the server, and display the combination image of which the layout is created based on the information on the layout transmitted from the server and received by the first terminal device on the first terminal device.

It is preferable that the processor is configured to calculate a score of each image for analysis included in the image group for analysis on the server, and select, as the candidate image, an image corresponding to an image for analysis of which the score transmitted from the server and received by the first terminal device is equal to or greater than a predetermined reference value or an image corresponding to an image for analysis of which the score is in a predetermined percentage, from the image group other than the use images, on the first terminal device.

It is preferable that the processor is configured to analyze an attribute of each image for analysis included in the image group for analysis on the server, and select, as the candidate image, an image corresponding to an image for analysis of which the attribute transmitted from the server and received by the first terminal device matches an attribute of the additional image and an image corresponding to an image for analysis of which the attribute is in a predetermined range from the attribute of the additional image or select, as the candidate image, an image corresponding to an image for analysis of which the attribute does not match the attribute of the additional image and the attribute is out of the predetermined range from the attribute of the additional image, from the image group other than the use images, on the first terminal device.

It is preferable that the processor is configured to select candidate images for analysis from the image group for analysis other than the use images for analysis on the server, and select the candidate images corresponding to the candidate images for analysis transmitted from the server and received by the first terminal device, from the image group, on the first terminal device.

It is preferable that the processor is configured to display, as images available for the combination image, an image for analysis corresponding to the use image, an image for analysis corresponding to the candidate image, and an image for analysis corresponding to the additional image which are transmitted from the server and received by the second terminal device, in a case where the editing of the layout is restarted on the second terminal device, while the layout is being edited on the second terminal device, on the second terminal device.

It is preferable that the processor is configured to analyze the image group, select the use images based on an analysis result of the image group from the image group, create the layout by using the use images, and display the combination image of which the layout is created, on the first terminal device, and store information on the layout transmitted from the first terminal device and received by the server on the server.

It is preferable that the processor is configured to calculate, as the analysis result of the image group, a score of each image included in the image group, and select, as the candidate image, an image of which the score is equal to or greater than a predetermined reference value or an image of which the score is in a predetermined percentage in descending order, from the image group other than the use images, on the first terminal device.

It is preferable that the processor is configured to analyze an attribute of each image included in the image group, and select, as the candidate image, an image on which an editing operation is performed by a user while the layout is being edited on the first terminal device and which is not used for the combination image after the layout is edited on the first terminal device from the image group other than the use images based on information about an editing operation image on which an editing operation is performed by the user, on the first terminal device.

It is preferable that the processor is configured to select, as the candidate image, an image that is not used for the combination image from the image group other than the use images after an editing operation is performed by a user and the layout is edited on the first terminal device based on information on an editing operation image on which an editing operation is performed by the user while the layout is being edited on the first terminal device, on the first terminal device.

It is preferable that the processor is configured to select the candidate image based on a past order history of the user from the image group other than the use images on the first terminal device.

It is preferable that the processor is configured to transmit, as the candidate image, a predetermined number of images or an image of a predetermined percentage in the image group from the first terminal device to the server.

It is preferable that the processor is configured to transmit, as the candidate image, the number of images corresponding to a situation of the network from the first terminal device to the server.

It is preferable that the processor is configured to transmit at least some images included in a group including the use images and the candidate images from the first terminal device to the server while the layout is being edited on the first terminal device.

It is preferable that the processor is configured to transmit a remaining image included in the group and the additional image from the first terminal device to the server according to an instruction from a user after the layout is edited on the first terminal device.

It is preferable that the processor is configured to transmit the use images, the candidate images, and the additional image from the first terminal device to the server according to an instruction from a user after the layout is edited on the first terminal device.

It is preferable that the processor is configured to transmit, as the candidate image, an image corresponding to information on an image other than the use images, the candidate images, and the additional image in the image group which is included in a notification transmitted from the second terminal device and received by the first terminal device from the first terminal device to the server in response to the notification.

It is preferable that the processor is configured to display, as images available for the combination image, the use images, the candidate images, and the additional image which are transmitted from the server and received by the second terminal device, in a case where the editing of the layout is restarted on the second terminal device, while the layout is being edited on the second terminal device, on the second terminal device.

The present invention is an image processing method for creating a layout of a combination image by using some images selected from an image group of a first terminal device in an image processing apparatus that includes a server, the first terminal device, and a second terminal device different from the first terminal device which are connected via a network. The image processing method includes displaying, by an image display unit of the first terminal device, the combination image of which the layout is created on the first terminal device, selecting, by a candidate image selection unit of the first terminal device, candidate images available for the combination image in a case where editing of the layout is restarted on the second terminal device, from the image group based on a predetermined reference while the layout is being edited on the first terminal device, the candidate images being some images other than use images being in use for the combination image, and storing, by an information storage unit of the server, the use images, the candidate images, and an additional image which is newly added to the combination image from the image group other than the use images by editing the layout on the first terminal device, which are transmitted from the first terminal device and received by the server.

Here, it is preferable that the image processing method further includes creating, by an analysis image group creation unit of the first terminal device, an image group for analysis which has a resolution required for analyzing the image group and has a smaller amount of data than the image group from the image group, analyzing, by an image analysis unit of the server, the image group for analysis transmitted from the first terminal device and received by the server, selecting, by a use image selection unit of the server, use images for analysis based on an analysis result of the image group for analysis from the image group for analysis, creating, by a layout creation unit of the server, the layout by using the use images for analysis, storing, by the information storage unit of the server, information on the layout, and displaying, by the image display unit of the first terminal device, the combination image of which the layout is created based on the information on the layout transmitted from the server and received by the first terminal device.

It is preferable that the image processing method further includes analyzing, by an image analysis unit of the first terminal device, the image group, selecting, by a use image selection unit of the first terminal device, the use images from the image group based on an analysis result of the image group, creating, by a layout creation unit of the first terminal device, the layout by using the use images, displaying, by the image display unit of the first terminal device, the combination image of which the layout is created, and storing, by an information storage unit of the server, information on the layout transmitted from the first terminal device and received by the server.

The present invention provides a program causing a computer to execute the image processing method.

The present invention provides a computer-readable recording medium having a program causing a computer to execute the image processing method recorded thereon.

According to the present invention, the use images, the additional images, and the information on the layout are stored in the server, and thus, the editing of the layout can be seamlessly restarted even in a case where the device is changed from the first terminal device having the image group to the second terminal device not having the image group.

The candidate images are stored in the server, and thus, the user can perform in the editing work of the layout by using not only the use images and the additional images but also the candidate images while the layout is being edited on the second terminal device even in a case where the user changes the device from the first terminal device to the second terminal device and restarts the editing of the layout. Accordingly, the convenience for editing can be enhanced, and an editing range can be expanded.

According to the present invention, only the candidate images are selected from the image group and transmitted to the server, and thus, a waiting time of the user until the images available for the combination image can are transmitted to the server can be significantly further reduced than where all the images included in the image group are transmitted to the server.

The use images and the candidate images are transmitted to the server while the layout is being edited on the first terminal device, that is, in the background of the editing operation of the layout by the user, and thus, a transmission time for the user to experience to transmit the use images and the candidate images can be significantly further reduced than in a case where a dedicated time in which the use images and the candidate images are transmitted to the server is set after the editing of the layout and the use images and the candidate images are transmitted to the server.

BRIEF DESCRIPTION OF THE DRAWINGS

FIG. 7 is a conceptual diagram of an embodiment showing a display screen of an application for a smartphone.

DESCRIPTION OF THE PREFERRED EMBODIMENTS

Hereinafter, an image processing apparatus, an image processing method, a program, and a recording medium according to an embodiment of the present invention will be described in detail based on preferred embodiments shown in the accompanying drawings.

Figure 1:
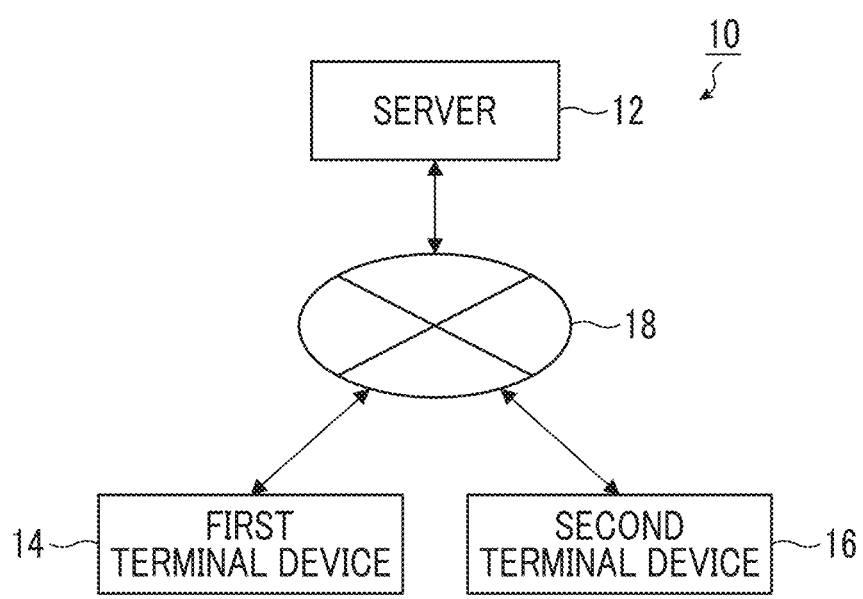
FIG. 1 is a block diagram of an embodiment showing a configuration of an image processing apparatus according to an embodiment of the present invention.

FIG. 1 is a block diagram of an embodiment showing a configuration of the image processing apparatus according to the embodiment of the present invention. An image processing apparatus 10 shown in FIG. 1 is a server 12, a first terminal device 14, and a second terminal device 16 different from the first terminal device 14 which are connected via a network (communication line) 18. The image processing apparatus 10 creates automatically a layout of combination images such as a photo album (photobook) by using some images (photographs) selected from an image group of the first terminal device 14, that is, an image group of a user.

In the case of the present embodiment, the server 12 has a function of automatically creating a layout of a combination image from information on the combination image and an image group for analysis transmitted from the first terminal device 14, a function of storing use images, candidate images, additional images, information of the layout, and the like transmitted from the first terminal device 14, and the like. The number of servers 12 is not limited to one, but a plurality of servers may be used. The server is a workstation including a control device, a storage device, a communication device (transmission unit and reception unit), and the like, and the like.

The first and second terminal devices 14 and 16 are user terminal devices used by the same user, and have a function of displaying the combination image and editing the layout thereof, and the like. Each of the first and second terminal devices 14 and 16 is a desktop PC, a laptop PC, a tablet PC, a portable terminal such as a smartphone, or the like that includes a control device, an input device, a storage device, a communication device, a display (display device), and the like. The number of terminal devices may be three or more.

The network 18 connects the server 12, the first terminal device 14, and the second terminal device 16 to each other in at least one of a wired or wireless manner, and has a function of transmitting and receiving various kinds of data to and from the server 12, the first terminal device 14, and the second terminal device 16. The network 18 is, for example, Wireless Fidelity (Wi-Fi), a telephone line (carrier line), and the like. A plurality of terminal devices of a plurality of users can be connected via the network 18.

Next, the details of the server 12, the first terminal device 14, and the second terminal device 16 will be described.

Figure 2:
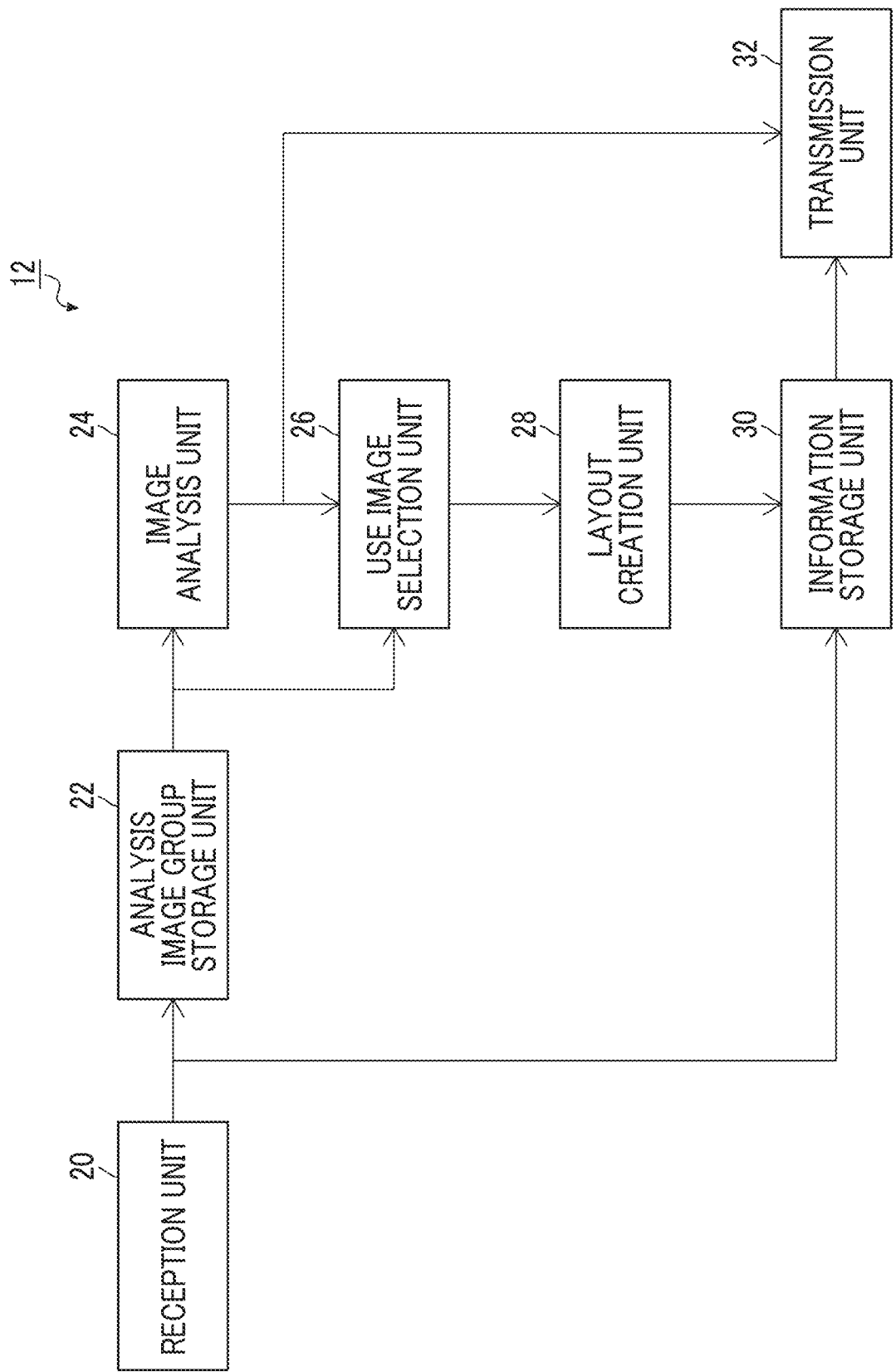
FIG. 2 is a block diagram of an embodiment showing a configuration of a server.

FIG. 2 is a block diagram of an embodiment showing a configuration of the server. The server 12 shown in FIG. 2 includes a reception unit 20, an analysis image group storage unit 22, an image analysis unit 24, a use image selection unit 26, a layout creation unit 28, an information storage unit 30, and a transmission unit 32.

The reception unit 20 receives various kinds of data transmitted from the first and second terminal devices 14 and 16. In the case of the present embodiment, the reception unit 20 receives the information of the combination image desired to be created by the user, the image group for analysis, the use images, the candidate images, the additional images, information on the layout after the layout is edited on the first terminal device 14, and the like which are transmitted from the first terminal device 14. The reception unit 20 receives the information on the layout after the layout is edited on the second terminal device 16 and the like which are transmitted from the second terminal device 16.

The information on the combination image is information such as a size of the combination image (A5, A4, and A5 square meters, and the like), the number of pages (16 pages, 24 pages, 32 pages, 40 pages 48 pages, and the like), and the like which are desired to be created by the user. The minimum required number of images required to create the combination image is decided by the information such as the size of the combination image and the number of pages. For example, in a case where the number of pages of a photo album is 24, the minimum required number is decided to be 100.

The image group for analysis is an image group for analysis created from the image group of the first terminal device 14, and an image group that has a resolution required for analysis of the image group and has a less amount of data than the image group.

In the case of the present embodiment, the use image is an image corresponding to a use image for analysis being in use for the combination image of which the layout is automatically created by the image processing apparatus 10 in the image group.

The candidate images are some images other than the use image in the image group, and is an image available for the combination image while the layout is being edited on the second terminal device 16. In a case where the editing of the layout is restarted on the second terminal device 16 that does not have the image group, the image processing apparatus 10 selects, as the candidate image, an image regarded as being highly likely to be used for the combination image by the user from the image group while the layout is being edited on the second terminal device.

The additional image is an image newly added to the combination image from the image group by editing the layout on the first terminal device 14. That is, the combination image after the layout is edited on the first terminal device 14 includes the use image and the additional image.

The information on the layout is information of the image included in the combination image, and information such as the arrangement of the image in the layout and a size of the image.

Subsequently, the analysis image group storage unit 22 stores the image group for analysis received from the first terminal device 14 by the reception unit 20.

Subsequently, the image analysis unit 24 analyzes the image group for analysis stored in the analysis image group storage unit 22 for one or more analysis items.

The analysis items are not particularly limited, but may include detection of subjects (persons and objects other than persons) appearing in an image, detection of a person as a main character, detection of a specific subject designated by the user, detection of a face of a person, detection of the number of persons, detection of a facial expression of a person, detection of an action of a person, and the like.

The analysis item may include detection of a scene (night view, sea, sandy beach, sky, or the like) appearing in an image, detection of an event (sports day, wedding, graduation ceremony, or the like), detection of user's preference (preference for a sea image, preference for a mountain image, or the like), and the like.

The analysis item may include analysis of image quality of an image such as brightness, hue (saturation), contrast, and degree of blurring of the image.

The analysis item may include analysis of attributes of an image such as a capturing time and a capturing location included in additional information on an image such as exchangeable image file format (Exif).

The analysis item may include detection of images in which subjects having degrees of similarity equal to or higher than a reference value appear.

A method for calculating the degrees of similarity is not particularly limited, but the degrees of similarity between the images can be detected based on, for example, a plurality of feature values of the images. The feature value is generated by, for example, a resolution of an image, the amount of data, a degree of blurring, a type of a main subject, a size of the main subject relative to the image, or a position or tint of the main subject, or a combination of the plurality of feature values. The feature value may be generated in one dimension or a plurality of dimensions in which a learned model learned by supervised learning or unsupervised learning in advance receives and outputs an image. Here, although the feature value output from the learned model may not be meaningfully interpreted by human, as long as the feature value is at least a numerical value group that is uniquely output in a case where one image is input, the numerical value group can be used as the feature value of the present invention, in a two-dimensional feature value space with a first feature value as a horizontal axis and a second feature value as a vertical axis, the images included in the image group are distributed in the feature value space, and as a distance between the images in the feature value space becomes shorter, the degree of similarity between the images becomes higher.

The analysis item may include analysis of the entire image group for analysis, such as an analysis of the number of images per unit time and the distribution (density) of the images.

The analysis result of the entire image group for analysis can be used for classification (grouping) of images to be arranged on page spreads of the photo album. For example, in a case where the image group is divided into spring, summer, autumn, and winter groups, the number of captured images may vary depending on the season, such as a case where there are many summer images. In a case where there are more summer images than the other seasonal images, the page spreads are used such that the number of summer images to be used in the photo album is increased in proportion to the number of images and the number of page spreads on which the summer images are used is increased from four pages to five pages among 12 page spreads of the photo album.

The analysis item may include calculation of scores (evaluation values) of an image.

A method for calculating the score is not particularly limited, but for example, a total value of scores of a plurality of analysis items can be used as the score of each image. The score of the image may be weighted, such as a case where a score of an image in which the main character appears is weighted and increased and a score of an image on a capturing date on which the number of captured images is large is weighted and increased.

For example, as shown in Table 1, for images (file name: images A, B, C, D, E, F, G, . . . ) Included in the image group, the scores of the plurality of analysis items (degree of blurring, brightness status, color, and the number of persons (faces)) are calculated, and the total value of the scores of the plurality of analysis items is used as the score of each image. For example, in the image A, the score of the degree of blurring is 80 points, the score of the brightness status is 90 points, the score of the color is 85 points, the score of one face is 100 points, and the score of the person (face) is 200 points. The total value (score) is 455 points.

TABLE 1

| File name | Degree of blurring | Brightness status | Color | Number of persons (faces) | Score |
| --- | --- | --- | --- | --- | --- |
| Image A | 80 | 90 | 85 | Two (200 points) | 455 |
| Image B | 90 | 70 | 60 | One (100 points) | 320 |
| Image C | 90 | 85 | 80 | Three (300 points) | 555 |

TABLE 1-continued

| File name | Degree of blurring | Brightness status | Color | Number of persons (faces) | Score |
| --- | --- | --- | --- | --- | --- |
| Image D | 70 | 60 | 85 | One (100 points) | 315 |
| Image E | 85 | 80 | 70 | Two (200 points) | 435 |
| Image F | 60 | 80 | 50 | Zero (0 point) | 190 |
| Image G | 70 | 50 | 70 | One (100 points) | 290 |
| . . . | . . . | . . . | . . . | . . . . . . | . . . |

Subsequently, the use image selection unit 26 selects the use image for analysis to be used for the combination image from the image group for analysis based on the analysis result of the image group for analysis.

A method for selecting the use image for analysis is not particularly limited, but for example, images corresponding to the number of images to be used for the combination image can be selected from among images in which a specific subject appears, images of a specific scene, images of a specific event, or images matching user's preference in the image group for analysis. The images corresponding to the number of images to be used in the combination image may be selected in descending order of the scores of the images. The images may be selected by combining the results of the plurality of analysis items.

Subsequently, the layout creation unit 28 automatically creates the layout of the combination image by using the information on the use image for analysis and the combination image.

In the case of the photo album, for example, the layout creation unit 28 classifies the use images for analysis into a plurality of groups corresponding to the number of pages of the photo album based on the additional information on the image, selects a plurality of use images for analysis corresponding to the number of images to be arranged in each page from among the use images for analysis classified into the group corresponding to each page in each page based on the score of the image and the like, and creates the layout by using the use images for analysis corresponding to the selected number of images.

A method for creating the layout is not particularly limited, but an image having a high score can be preferentially laid out based on the analysis result. For example, an image having a high score may be disposed in a center of the combination image, or a size of an image having a high score may be increased.

Subsequently, the information storage unit 30 stores various kinds of data on the server 12. In the case of the present embodiment, the information storage unit 30 stores the information on the layout automatically created by the layout creation unit 28, information of the edited layout transmitted from the first and second terminal devices 14 and 16, and the like. The information storage unit 30 integrates and stores the use images, the candidate images, and the additional images transmitted from the first terminal device 14 for each combination image.

It is desirable that the information storage unit 30 distinguishably stores the use images, the additional images, and the candidate images. Accordingly, since the use images and the additional images (the images being in use for the combination image) and the candidate images (the images that can be newly added to the combination image) can be distinguishably displayed in a case where the editing of the layout is restarted on the second terminal device 16, the user can recognize the images being in use for the combination image and the image that can be newly added to the combination image at a glance.

The transmission unit 32 transmits various kinds of data to the first and second terminal devices 14 and 16. In the case of the present embodiment, the transmission unit 32 transmits the information on the layout automatically created, the analysis result of the image group for analysis, and the like to the first terminal device 14. The transmission unit 32 transmits the use images, the candidate images, the additional images, the information on the layout, and the like to the second terminal device 16 in a case where the editing of the layout is restarted on the second terminal device 16.

Figure 3:
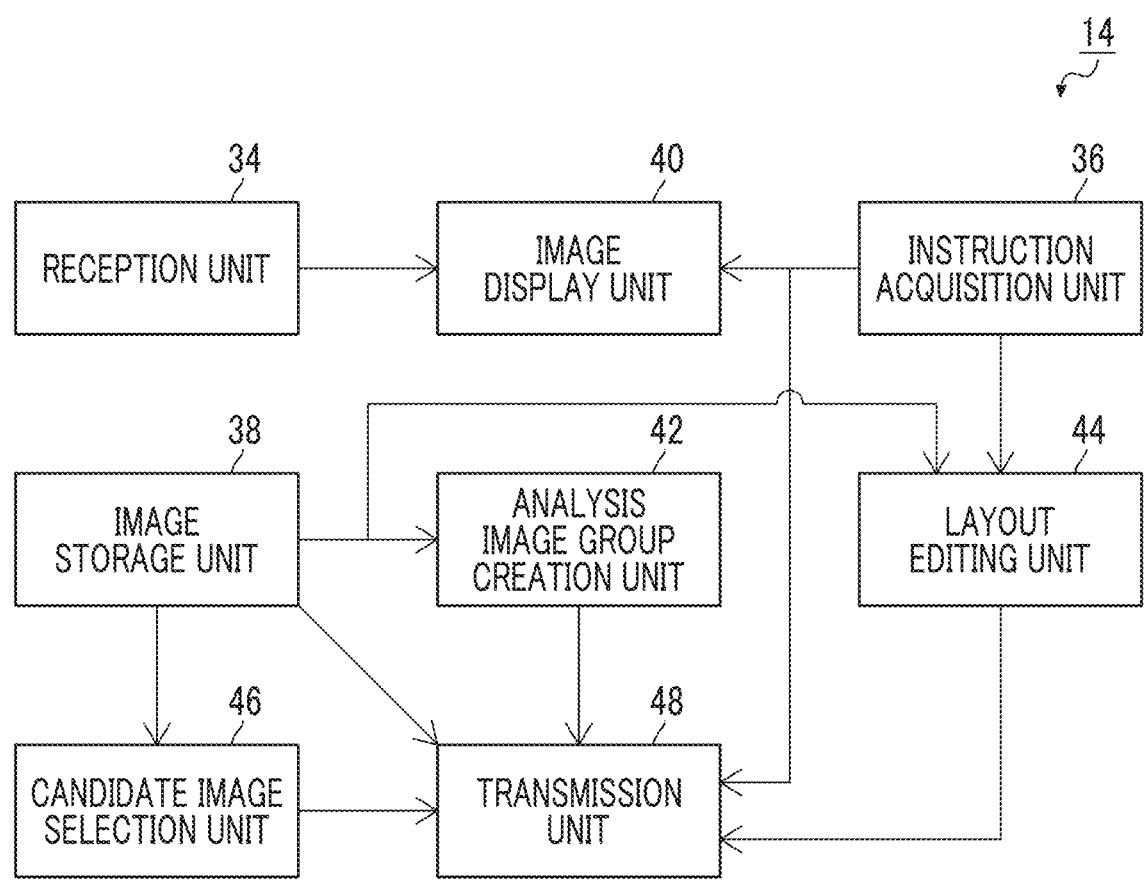
FIG. 3 is a block diagram of an embodiment showing a configuration of a first terminal device.

FIG. 3 is a block diagram of an embodiment showing a configuration of the first terminal device. The first terminal device 14 shown in FIG. 3 includes a reception unit 34, an instruction acquisition unit 36, an image storage unit 38, an image display unit 40, an analysis image group creation unit 42, a layout editing unit 44, a candidate image selection unit 46, and a transmission unit 48.

The reception unit 34 receives (downloads) various kinds of data transmitted from the server 12. In the case of the present embodiment, the reception unit 34 receives the analysis result of the image group for analysis, the information on the layout of the combination image automatically created, and the like transmitted from the server 12.

Subsequently, the instruction acquisition unit 36 acquires various instructions input by the user by using an input device such as a keyboard, a mouse, a touch pad, and a touch panel.

The instruction from the user is not particularly limited, but includes an instruction to designate the information of the combination image desired to be created by the user, an instruction to designate information on the image group to be used for the combination image, an instruction to edit the layout, an instruction to end the editing of the layout, and the like in the case of the present embodiment.

As the information on the image group, the user can input, for example, an instruction to designate the image group to be used for the combination image, such as an instruction to designate a location of a folder of the image group stored in the first terminal device 14, an instruction to read an image group stored in an external storage device such as a secure digital (SD) card and a Universal Serial Bus (USB) memory, and an instruction to designate the image group to be used for the combination image in a capturing period of the image from the image group stored in the first terminal device 14.

Subsequently, the image storage unit 38 stores the image group available for the combination image which is designated by the instruction from the user.

Subsequently, the image display unit 40 displays various images on the first terminal device 14. In the case of the present embodiment, the image display unit 40 displays an input screen for designating the information on the combination image desired to be created by the user, the information of the image group, and the like, a layout editing screen for editing the layout of the combination image, the images included in the image group, and the like. The image display unit 40 displays the combination image of which the layout is automatically created based on the information on the layout transmitted from the server 12.

Subsequently, the analysis image group creation unit 42 creates the image group for analysis from the image group stored in the image storage unit 38.

The resolution required for analysis is not particularly limited, but can be a resolution equal to or tower than the resolution of each image included in the original image group, for example, a resolution equal to or higher than a resolution with 640 pixels in a width direction×480 pixels in a height direction of Video Graphics Array (VGA).

A method for reducing the amount of data is also not particularly limited, but for example, a method for reducing a physical size of each image included in the original image group in the width direction and the height direction and resizing the image, a method for compressing the image, and the like are included.

Subsequently, the layout editing unit 44 edits the layout of the combination image displayed on the image display unit 40 according to the instruction of the user while the layout is being edited on the first terminal device 14.

Subsequently, the candidate image selection unit 46 selects the candidate images available for the combination image from the image group on a background in a case where the editing of the layout is restarted on the second terminal device 16, The candidate images are some images other than the use images being in use for the combination image based on a predetermined reference (selection reference of the candidate images) while the layout is being edited on the first terminal device 14. In other words, the candidate images are images regarded as being likely to be desired to be used for the combination image by the user in a case where the editing of the layout is restarted on the second terminal device 16.

The reference for the candidate image selection unit 46 to select the candidate images are not particularly limited, and for example, the following methods (1) to (4) can be exemplified. Two or more methods of these methods (1) to (4) may be combined.

(1) Use of Analysis Result of Image Group for Analysis

The candidate images can be selected based on the scores of the images for analysis included in the image group for analysis from the image group other than the use images.

For example, images corresponding to images for analysis of which the scores are equal to or higher than a predetermined reference value (threshold value) or images for analysis of which the score is in a predetermined percentage in descending order (for example, 20% of images in the image group) are selected, as the candidate images, from the image group other than the use images.

The reference value of the score and the percentage can be set voluntarily.

Table 2 is a table in which the items of "layout completed" and "candidate image" are further added to the above-mentioned Table 1. In the item of "layout completed" in Table 2, the use image is represented by "Y", and the image other than the use image is represented by "X". In the item of "candidate image", the use image is represented by "–", the image selected as the candidate image is represented by "Y", and the image not selected as the candidate image is represented by "X".

As shown in Table 2, it is assumed that an image C having a score of 555 points and an image A having a score of 455 points are selected, as the use images, from among images A, B, C, D, E, F, G, . . . in descending order of the scores. In this ease, in a case where 20% of images of which the scores is higher (one image in the case of Table 2) are selected, as the candidate images, from among the images B, D, E, F, G, . . . other than the use images A and C, the image F having a score of 435 points which is the highest score next to the images A and C is selected as the candidate image.

TABLE 2

| File name | Degree of blurring | Brightness status | Color | Number of persons (faces) | Score | Layout completed | Candidate image |
|---|---|---|---|---|---|---|---|
| Image A | 80 | 90 | 85 | Two (200 points) | 455 | Y | — |
| Image B | 90 | 70 | 60 | One (100 points) | 320 | X | X |
| Image C | 90 | 85 | 80 | Three (300 points) | 555 | Y | — |
| Image D | 70 | 60 | 85 | One (100 points) | 315 | X | X |
| Image E | 85 | 80 | 70 | Two (200 points) | 435 | X | Y |
| Image F | 60 | 80 | 50 | Zero (0 point) | 190 | X | X |
| Image G | 70 | 50 | 70 | One (100 points) | 290 | X | X |
| ... | ... | ... | ... | ... | ... | ... | ... |

(2) Editing Operation by User

For example, information of an editing operation image on which an editing operation is performed by the user can be stored, and images which are not used for the combination image can be selected as the candidate images from the image group other than the use images based on the stored information on the editing operation image on which an editing operation is performed by the user while the layout is being edited on the first terminal device 14 and after the layout is edited on the first terminal device 14.

For example, although the image is added to the combination image once from the image group other than the use images while the layout is being edited on the first terminal device 14, the image which is deleted from the combination image later and is not included in the combination image after the layout is ended is regarded as an image that is highly likely to be added to the combination image in a case where the editing of the layout is restarted on the second terminal device 16. The image enlarged and displayed while the layout is being edited on the first terminal device 14 is regarded as an image of interest to the user. Accordingly, these images are selected as the candidate images.

(3) Attribute of Additional Image

An image corresponding to the image for analysis of which an attribute matches the attribute of the additional image and an image corresponding to the image for analysis of which the attribute is in a predetermined range from the attribute of the additional image can be selected, as the candidate images, from the image group other than the use images. As stated above, the image of which the attribute is the same as the attribute of the additional image or close to the additional image is selected as the candidate image, and thus, the candidate image that is highly likely to be added to the combination image can be provided to the user in a case where the editing of the layout is restarted on the second terminal device 16.

For example, an image of which a capturing date is the same as a capturing date of the additional image and an image of which capturing date and time are within a predetermined range from a capturing date and time of the additional image (an image captured for several days before and after the capturing date of the additional image, an image captured for several times before and after the capturing time of the additional image, and the like) are selected as the candidate images.

An image of which a capturing location is the same as a capturing location of the additional image and an image of which the capturing location is within a predetermined range from the capturing location of the additional image are selected as the candidate images by using positional information of the Global Positioning System (GPS).

Images in which the subjects (persons and objects other than the persons) appearing in the image are the same and images in which the degrees of similarity of the subjects are equal to or more than a reference value are selected as the candidate images based on the analysis result of the image group for analysis.

On the other hand, an image corresponding to the image for analysis of which the attribute does not match the attribute of the additional image and the attribute is out of the predetermined range from the attribute of the additional image can be selected as the candidate image. As stated above, the image of which the attribute does not match the attribute of the additional image and is far from the additional image is intentionally selected as the candidate image, and thus, a new candidate image which is not anticipated by the user can be provided, as an image to be added to the combination image, to the user in a case where the editing of the layout is restarted on the second terminal device 16.

For example, an image captured on a capturing date that is different from the additional image and is out of the predetermined range (an image captured on the second day and the like in a case where images captured on the first day and the third day from the image group captured on the first day, the second day, and the third day is added, as the additional image, to the combination image) is selected as the candidate image.

An image of which a capturing location is different from the capturing location of the additional image and which is captured at a capturing location out of the predetermined range is selected as the candidate image by using the positional information of the GPS.

An image in which the subject appearing in the image is different and the degree of similarity of the subject is less than the reference value is selected as the candidate image based on the analysis result of the image group for analysis.

In a case where the combination image is the photo album, the image group is classified into groups of images available on each page of the photo album, and a layout is created on each page by using the images corresponding to each group. For example, the number of pages of the photo album is 12, the image group is classified into groups of images from January to December corresponding to 12 pages, and the layout is created on each page by using the images corresponding to each group.

In this case, it is desirable to select, as the candidate image, an image of which the attribute matches the attribute of the additional image or an image of which the attribute does not match the attribute of the additional image from the images of the group other than the use images corresponding to each page on each page, instead of selecting, as the candidate image, an image of which the attribute matches the attribute of the additional image or an image of which the attribute does not match the attribute of the additional image from the images of the group corresponding to another page in the image group other than the use images on each page.

Accordingly, it possible to prevent the proposal of an image having a sense of incongruity, such as proposal of the image of the group corresponding to the page of January as the candidate image to be proposed for the page of July.

(4) Past Order History of User

For example, a past order history of the user can be stored, and the candidate image can be selected from the image group other than the use images based on the past order history of the user.

For example, an image in which the same subject as the subject appearing in the image ordered in the past and the subject having the degree of similarity equal to or higher than the reference value appears is selected as the candidate image based on the analysis result of the degrees of similarity of the images. As stated above, the image having the same or similar degree of similarity as the additional image is selected as the candidate image, and thus, the candidate image that is highly likely to be added to the combination image can be provided to the user in a case where the editing of the layout is restarted on the second terminal device 16.

An image in which a subject different from the subject appearing in the image ordered in the past and a subject having a degree of similarity less than the reference value appears is selected as the candidate image based on the degrees of similarity of the images. As stated above, the image of which the degree of similarity is far from the additional image is selected as the candidate image, and thus, a new candidate image which is not anticipated by the user can be provided, as an image to be added to the combination image, to the user in a case where the editing of the layout is restarted on the second terminal device 16.

The number of candidate images is not particularly limited. However, for example, a predetermined number of images or an image of a predetermined percentage (for example, 20% of images) in the image group can be transmitted, as the candidate image, from the first terminal device 14 to the server 12.

Further, the number of images corresponding to a situation of the network 18 may be transmitted, as the candidate image, from the first terminal device 14 to the server 12. For example, the number of candidate images is decided according to the type of the network 18, such as the number of candidate images in a case where the type of the network 18 is Wi-Fi and the number of candidate images in a case where the type of the network is a telephone line. Alternatively, the number of candidate images may be decided according to a communication speed of the network 18, such as the number of candidate images in a case where the communication speed of the network 18 is equal to or higher than a reference value and the number of candidate images in a case where the communication speed of the network is less than the reference value, Subsequently, the transmission unit 48 transmits (uploads) various kinds of data to the server 12. In the case of the present embodiment, the transmission unit 48 transmits the information on the combination image, the image group for analysis, and the like to the server 12. The transmission unit 48 transmits the candidate image to the server 12 while the layout is being edited on the first terminal device 14, and transmits the use images, the additional images, information on the layout after the layout is edited on the first terminal device 14, and the like to the server 12 after the layout is edited on the first terminal device 14.

Figure 4:
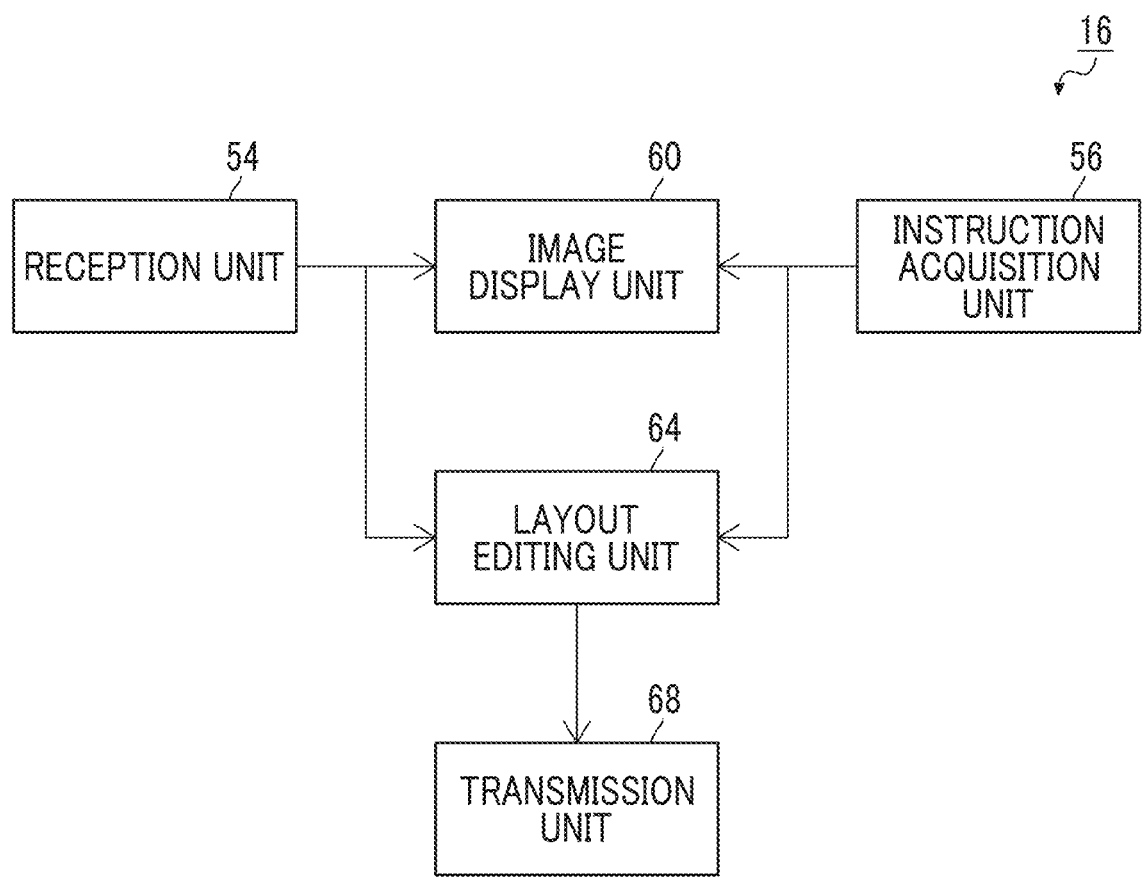
FIG. 4 is a block diagram of an embodiment showing a configuration of a second terminal device.

FIG. 4 is a block diagram of an embodiment showing a configuration of the second terminal device. The second terminal device 16 shown in FIG. 4 includes a reception unit 54, an instruction acquisition unit 56, an image display unit 60, a layout editing unit 64, and a transmission unit 68.

The reception unit 54 receives various kinds of data transmitted from the server 12. In the case of the present embodiment, the reception unit 54 receives the use images, the candidate images, the additional images, the information on the layout edited on the first terminal device 14, and the like from the server 12.

Subsequently, the instruction acquisition unit 56 acquires various instructions input by the user by using the input device.

The instruction from the user is not particularly limited, but includes an instruction to designate the combination image for which the editing of the layout is restarted, an instruction to edit the layout, an instruction to end the editing of the layout, and the like in the case of the present embodiment.

Subsequently, the image display unit 60 displays various images on the second terminal device 16. In the case of the present embodiment, the image display unit 60 displays an input screen for designating the combination image for which the user desires to restart the editing of the layout. The image display unit 60 displays an editing screen of the layout, and displays, as images available for the combination image, the use images, the candidate images, the additional images, and the like based on the use images, the additional images, and the information on the layout transmitted front the server 12 in a case where the editing of the layout is restarted on the second terminal device 16.

Subsequently, the layout editing unit 64 edits the layout of the combination image displayed on the image display unit 60 according to the instruction of the user while the layout is being edited on the second terminal device 16.

Subsequently, the transmission unit 68 transmits various kinds of data to the server 12. In the case of the present embodiment, the transmission unit 68 transmits the information on the layout and the like after the layout is edited on the second terminal device 16 to the server 12.

Next, an operation of the image processing apparatus 10 according to the embodiment of the present invention will be described by taking as an example a case where the first terminal device 14 is a PC and the second terminal device 16 is a smartphone.

The user edits a layout of the page of the photo album by using an application for a PC that realizes functions of the image processing apparatus 10 on the PC 14, ends an editing work of the layout once, changes the device from the PC 14 to the smartphone 16, and similarly restarts the editing of the layout by using an application for a smartphone that realizes the functions of the image processing apparatus 10 on the smartphone 16.

Figure 5:
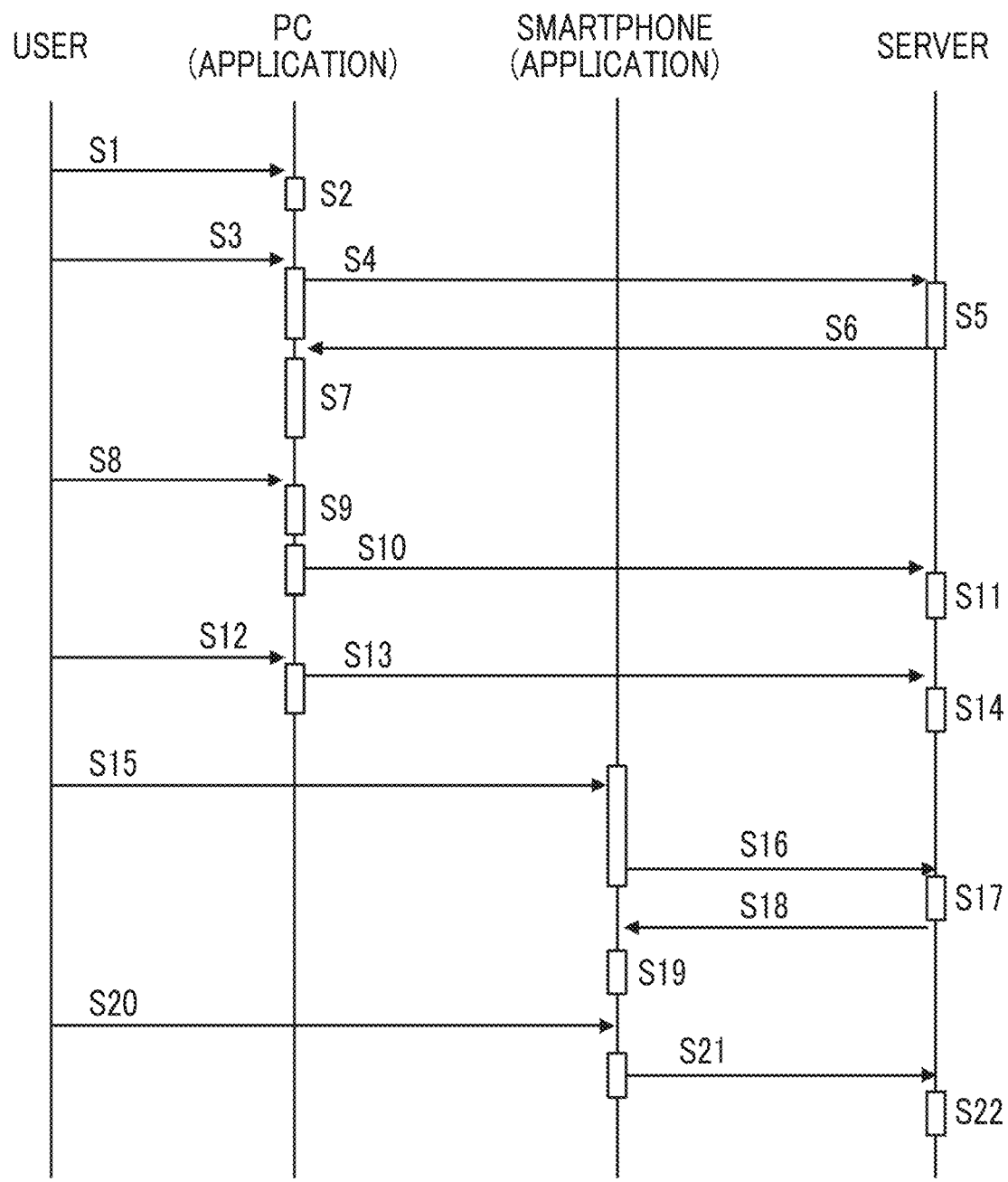
FIG. 5 is a conceptual diagram of an embodiment showing an operation of the image processing apparatus.

FIG. 5 is a conceptual diagram of an embodiment showing the operation of the image processing apparatus. A vertical line at a left end shown in FIG. 5 represents a flow of an operation of the user from an upper side to a lower side, and vertical lines similarly represent a flow of an operation of the application for the PC, a flow of an operation of the application for the smartphone, and a flow of an operation of the server 12 in order toward a right side from the vertical line at the left end, respectively.

As shown in FIG. 5, the user activates the application for the PC on the PC 14 having the image group (step S1), and inputs information such as the size and the number of pages of the photo album desired to be created by the user, information on the image group to be used for the photo album, and the like on the input screen (product order screen) displayed on the image display unit 40 at the time of starting the creation of the photo album (step S2) (step S3).

Thus, the information on the photo album and the information of the image group input by the user are acquired by the instruction acquisition unit 36, and the image group designated by the information of the image group is acquired and stored in the image storage unit 38 (step S4).

Subsequently, the image group for analysis is created from the image group stored in the image storage unit 38 by the analysis image group creation unit 42, and the information on the photo album and the image group for analysis are transmitted to the server 12 by the transmission unit 48 (step S4).

Since the amount of data in the image group for analysis is significantly smaller than that in the original image group, the transmission of the image group for analysis is ended in a significantly shorter time than the transmission of the image group.

Subsequently, on the server 12, the information on the photo album and the image group for analysis transmitted from the PC 14 are received by the reception unit 20 (step S5).

Subsequently, the image group for analysis is analyzed by the image analysis unit 24, the use images for analysis to be used for each page of the photo album are selected from the image group for analysis based on the analysis result of the image group for analysis by the use image selection unit 26, and the layout of each page of the photo album is automatically created by using the information on the photo album and the use image for analysis by the layout creation unit 28 (step S5).

Subsequently, the information on the layout of the photo album is stored in the information storage unit 30, and the information of the layout and the analysis result of the image group for analysis are transmitted to the PC 14 by the transmission unit 32 (step S6).

Subsequently, on the PC 14, the information on the layout and the analysis result of the image group for analysis transmitted from the server 12 are received by the reception unit 34, and the editing screen of the layout of the photo album is displayed on the image display unit 40 based on the information on the layout (step S7). In addition to the page of the photo album being edited, a list of images included in the image group is displayed, as images available for the photo album, on the editing screen of the layout.

Subsequently, the user browses the layout of the page being edited and inputs the instruction to edit the layout (step S8).

Since the PC 14 has the image group, the user can perform the editing work by using all the images included in the image group while the layout is being edited on the PC 14. It is not essential for the user to edit the layout on the PC 14.

In the automatically created layout, images desired to be included in the photo album by the user may not be included or images desired not to be included in the photo album by the user may be included. In this case, the user browses the layout of the page being edited and performs an editing work of adding a new image to the photo album or deleting an unnecessary image from the photo album from the image group other than the use images.

Thus, the instruction to edit the layout is acquired by the instruction acquisition unit 36, and the layout is edited by the layout editing unit 44 according to this instruction (step S9).

The candidate images are selected from the image group other than the use images based on the predetermined reference by the candidate image selection unit 46 while the layout is being edited (step S9), and the selected candidate images are similarly transmitted to the server 12 by the transmission unit 48 in real time in the background while the layout is being edited (step S10).

As stated above, only the candidate images are selected from the image group and transmitted to the server 12, and thus, a waiting time of the user until the images available in the photo album can are transmitted to the server 12 can be significantly further reduced than in a case where all the images included in the image group are transmitted to the server 12.

The candidate images are transmitted to the server 12 while the layout is being edited on the PC 14, that is, in the background of the editing operation of the layout by the user, and thus, a transmission time for the user to experience to transmit the candidate images can be significantly farther reduced than in a case where a dedicated time in which the candidate images are transmitted to the server 12 is set after the editing of the layout and the candidate images are transmitted to the server 12.

Subsequently, on the server 12, the candidate images transmitted from the PC 14 are received by the reception unit 20, and stored in the information storage unit 30 (step S11).

In a case where the editing of the layout on the PC 14 is ended, the user inputs the instruction to end the editing of the layout (step S12).

Thus, on the PC 14, the use images, the additional images, the information on the edited layout, and the like are transmitted to the server 12 by the transmission unit 48 (step S13).

In case where the candidate images are selected and transmitted to the server 12 while the layout is being edited on the PC 14 as in the present embodiment, the additional image added to the photo album by the user may be already transmitted, as the candidate image, to the server 12 after the layout is edited on the PC 14. In this case, since this additional image is already transmitted, as the candidate image, to the server 12, it is not necessary to transmit the additional image to the server 12 again, but it is desirable to transmit information for distinguishing the candidate image from the additional image to the server 12.

Subsequently, on the server 12, the use images, the additional images, the information on the edited layout, and the like transmitted from the PC 14 are received by the reception unit 20, and stored in the inhumation storage unit 30 (step S14).

The use images, the candidate images, the additional images, and the information on the layout edited on the PC 14 are integrated and stored in the information storage unit 30 for each photo album. Accordingly, the photo album for which the editing is restarted is designated in a case where the editing of the layout is restarted on the smartphone 16, and thus, the use images, the candidate images, the additional images, and the information on the layout edited on the PC 14 of this photo album can be specified.

Subsequently, on the smartphone 16, the user activates the application for the smartphone, and inputs the information for designating the photo album for which the editing of the layout is desired to be restarted on the input screen displayed on the image display unit 60 in a case where the editing of the layout is restarted (step S15).

Thus, the designated information of the photo album input by the user is acquired by the instruction acquisition unit 56, and the designated information of the photo album is transmitted to the server 12 by the transmission unit 48 (step S16).

Subsequently, on the server 12, the designated information of the photo album transmitted from the smartphone 16 is received by the reception unit 20 (step S17).

Subsequently, the use images, the candidate images, the additional images, the information on the layout, and the like of the photo album corresponding to the designated information of the photo album stored in the information storage unit 30 are transmitted to the smartphone 16 by, the transmission unit 32 (step S18).

Subsequently, on the smartphone 16, the use images, the candidate images, the additional images, the information on the layout, and the like of the photo album transmitted from the server 12 arc received by the reception unit 54, and the editing screen of the layout of the photo album is displayed on the image display unit 60 based on the information on the layout (step S19). In addition to the page being edited, the use images, the additional images, and the candidate images are displayed, as the images available in the photo album, on the editing screen of the layout.

Subsequently, the user browses the layout of the page being edited, and inputs the instruction to edit the layout while the layout is being edited on the smartphone 16 (step S20).

Although the smartphone 16 does not have the image group, the user can perform the editing work by using not only the use images and the additional images but also the candidate images while the layout is being edited on the smartphone 16. It is not essential for the user to edit the layout on the smartphone 16.

Thus, the instruction to edit the layout is acquired by the instruction acquisition unit 56, and the layout is edited by the layout editing unit 64 according to this instruction (step S21).

In a ease where the editing of the layout on the smartphone 16 is ended, the user inputs the instruction to end the editing of the layout (step S20).

Thus, on the smartphone 16, the information on the edited layout and the like are transmitted to the server 12 by the transmission unit 68 (step S21).

Subsequently, on the server 12, the information on the layout transmitted from the smartphone 16 by the reception unit 20 and stored in the information storage unit 30 (step S22).

As stated above, the use images, the additional images, and the information on the layout are stored in the server 12, and thus, the editing of the layout can be seamlessly restarted even in a case where the device is changed from the PC 14 having the image group to the smartphone 16 not having the image group.

The candidate images are stored in the server 12, and thus, the user can perform the editing work of the layout by using not only the use images and the additional images but also the candidate images while the layout is edited on the smartphone 16 even in a case where the user changes the device from the PC 14 to the smartphone 16 and restarts the editing of the layout. Accordingly; the convenience for editing can be enhanced, and an editing range can he expanded.

Figure 6:
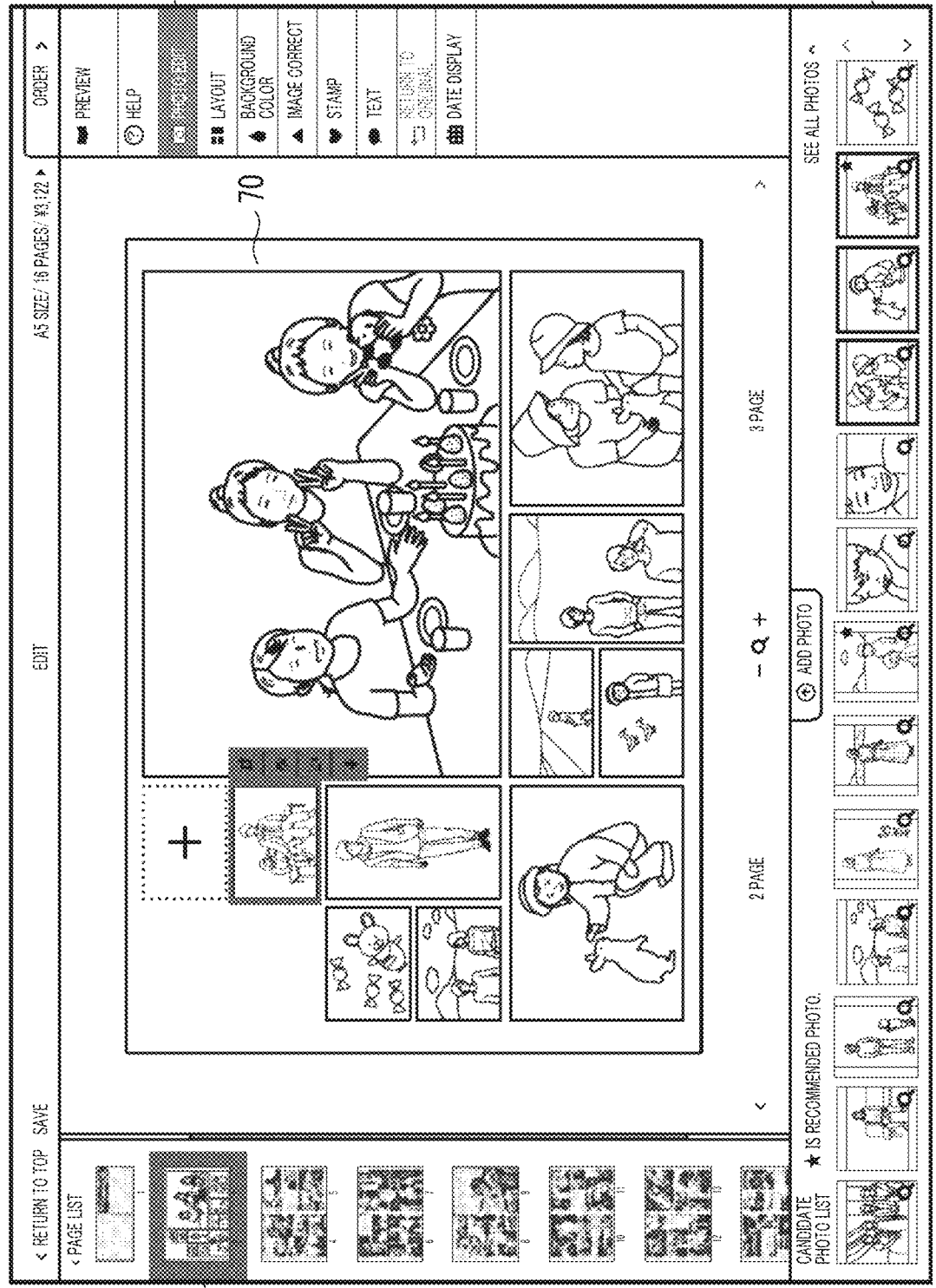
FIG. 6 is a conceptual diagram of an embodiment showing a display screen of an application for a PC.

FIG. 6 is a conceptual diagram of an embodiment showing a display screen of the application for the PC. FIG. 6 shows a layout editing screen for editing the layout of each page of the photo album.

The page of the photo album being edited, that is, a page spread 70 being edited in the case of the illustrated example is displayed in a center of the layout editing screen, and page numbers ("2 page" and "3 page") of the page spread 70 being edited are displayed on a lower side thereof.

An edit menu 72 is displayed at a right portion of the layout editing screen, that is, on a right side of the page spread 70 being edited. In the edit menu 72, buttons of "preview", "help", "photo edit", . . . and the like are displayed from an upper side to a lower side.

A list 74 of thumbnail images of the pages of the photo album is displayed at a left portion of the layout editing screen, that is, on a left side of the page spread 70 being edited, and a scroll bar is provided on a right side of the page list 74. In the case of the illustrated example, in the page list 74, a plurality of pages included in the photo album are sequentially displayed in ascending order of the page numbers from an upper side to a lower side, and the page numbers are displayed on a lower side of the thumbnail images of each page.

A list 76 of thumbnail images of the images included in the image group is displayed at a lower portion of the layout editing screen, that is, on a lower side of the page spread 70 being edited. In the case of the illustrated example, at least some images included in the image group are displayed in the image list 76 in chronological order from a left side to a right side in descending order of the capturing times of the images. A button of "magnifying glass" for enlarging and displaying the image is displayed on each image, and a star mark indicating a recommended image is attached to an image having a score equal to or higher than a certain value. The star mark is attached to the image, and thus, the user can recognize the image with the star mark as the recommended image at a glance.

Next, an operation in a case where the user edits the layout of the page spread 70 being edited on the PC 14 will be described.

The user can edit the layout on the PC by using the input device such as a keyboard and a mouse.

As shown in FIG. 6, the page list 74 of the photo album is displayed on the left portion of the layout editing screen.

In this state, the user can browse, as the page list 74, at least some of the thumbnail images of the pages of the photo album. The user can display and browse the thumbnail images of the remaining pages that are not displayed among the thumbnail images of all the pages by moving the scroll bar up and down.

In a case where the user clicks the thumbnail image of the page for which the layout is desired to be edited from the page list 74 with the mouse, the clicked thumbnail image of the page is selected from among the thumbnail images of the pages displayed in the page list 74, and the page corresponding to the clicked thumbnail image of the page is displayed, as the page spread 70 being edited, in the center of the layout editing screen.

In this state, the user can browse the page spread 70 being edited.

In a case where the user clicks a thumbnail image of another page from the page list 74, a page corresponding to the thumbnail image of another page can be displayed. In a case where the user clicks a button of "<" on a left side of the page number, a page before the page spread 70 being edited can be displayed, and in a case where the user clicks a button of ">" on a right side of the page number, a next page to the page spread 70 being edited can be displayed.

Subsequently, in a case where the user clicks the button of "photo edit" from the edit menu 72 on the editing screen of the layout, the image list 76 is displayed at the lower portion of the layout editing screen. In this state, the user can browse, as the image list 76, at least some of the thumbnail images of the images included in the image group. In a case where the user clicks a button of "view all photos", the remaining images of the image group that are not displayed in the image list 76 can be displayed. In a case where the user clicks the button of "magnifying glass" of one image from the images displayed in the image list 76 with the mouse, the clicked one image is enlarged and displayed on the image display unit 40. The image is enlarged and displayed, and thus, the user can browse the enlarged and displayed image and check the details thereof.

Subsequently, in a case where the user clicks an image desired to be added to the page spread 70 being edited from the image list 76, the clicked image is selected. The user can select one or two or more images at once from the image list 76.

Subsequently, in a case where the user drags and drops the selected image from the image list 76 to the page being edited with the mouse, an image corresponding to the selected image is automatically laid out on the page spread 70 being edited.

As stated above, the user can select and add an image corresponding to the image desired to be added to the page spread 70 being edited by the user from the image list 76. A case where the layout of the page is edited is not limited to a case where the image is added to the page being edited, for example, various kinds of editing such as rotating of a frame of the image, rotating and cropping of the image, deleting of the photo from the page being edited, and replacing of an arrangement position of the photo in the page can be performed.

FIG. 7 is a conceptual diagram of an embodiment showing a display screen of the application for the smartphone. A left side of FIG. 7 represents a layout editing screen for editing the layout of the page, and a right side represents an image display screen for displaying a list of images available for the page being edited.

The page of the photo album being edited, that is, a page spread 80 in the case of the illustrated example is displayed in a region above a center of the layout editing screen, and page numbers ("page 2 page 3") of the page spread 80 being edited are displayed on a lower side thereof.

A main menu 82 is displayed at a lower portion of the layout editing screen. In the main menu 82, buttons of "photo edit", "layout", "background color", ..., and the like are sequentially displayed from a left side to a right side. In the case of the illustrated example, a submenu 84 of "photo edit" is displayed above the main menu 82. In the submenu 84 of "photo edit", buttons of "frame rotate", "photo rotate and crop", "remove", "replace" and "add" are displayed from an upper left side to a lower right side, The page spread 80 being edited is displayed in a region from an upper portion of the image display screen to about ⅓, and a list 86 of thumbnail images of the images included in the image group is displayed in a region below the region of the page spread which is a region from a lower portion of the image display screen to about ⅔. A button 88 of "add and lay out selected photos" is displayed at a lower portion of the image display screen so as to be superimposed on the image list 86 in gray indicating that this button is invalid.

In the case of the illustrated example, at least some of the images for analysis included in the image group for analysis are displayed in the image list 86 in chronological order from an upper left side to a lower right side in descending order of the capturing times of the images. Of the image group for analysis, the use images and the additional images are displayed as "in use" and are displayed in bluish purple to indicate that they are used on the page spread 80 being edited. The candidate image is displayed surrounded by a red border and is displayed in color to indicate that the candidate image is available on the page spread 80 being edited. Unused images other than the use images, the additional images, and the candidate images in the image group for analysis are displayed in gray indicating that the unused images unavailable for the page spread 80 being edited. A button of "magnifying glass" for enlarging and displaying the image is displayed on each image, and a star mark indicating a recommended image is attached to an image having a score equal to or higher than a certain value.

Accordingly, the user can recognize images displayed in bluish purple as the use images and the additional images being in use for the page spread 80 being edited, images displayed in color as the candidate images available for the page spread 80 being edited, and images displayed in gray as the unused images unavailable on the page spread 80 being edited at a glance. The user can recognize the image with the star mark as the recommended image at a glance.

The color for distinguishing the use image, the additional image, the candidate image, and the unused image from one another is not particularly limited. A border surrounding the candidate image may be displayed or may not be displayed. The unused image may be displayed or may not be displayed.

Next, an operation in a case where the user edits the layout of the page spread 80 being edited on the smartphone 16 will be described.

The image display unit 60 of the smartphone is a touch panel, and the user can perform the editing work of the layout by using the touch panel as the instruction acquisition unit 56 in addition to using the touch panel as the image display unit 60 by performing a touch operation on the touch panel with a finger.

As shown on the left side of FIG. 7, the page spread 80 being edited is displayed on the layout editing screen.

In this state, the user can browse the page spread 80 being edited. In a case where the user taps a button of "<" on a left side of the page number with the finger, a page before the page spread 80 being edited can be displayed, and in a case where the user taps a button of ">" on a right side of the page number, a next page of the page spread 80 being edited can be displayed.

Subsequently, in a case where the user taps the button of "photo edit" from the main menu 82 on the editing screen of the layout, the submenu 84 of "photo edit" is displayed above the main menu 82.

Subsequently, in a case where the user taps a button of "add" from the submenu 84, the layout editing screen is switched to the image display screen. The pages being edited, that is, the page spread 80 and the image list 86 in the case of the illustrated example are displayed on the image display screen.

In this state, the user can browse at least some of the images for analysis included in the image group for analysis. In a case where the user swipes up and down the region of the image list 86 with the finger, the remaining images of the image group for analysis that are not displayed in the image list 86 can be displayed. In a case where the user taps a button of "magnifying glass" of one image from the images displayed in the image list 86, the tapped one image is enlarged and displayed on the image display unit 60. The image is enlarged and displayed, and thus, the user can browse the enlarged and displayed image and check the details thereof.

Subsequently, in a case where the user taps the candidate images desired to be added to the page spread 80 being edited from the image list 86, the tapped candidate images are selected. The user can select one or two or more candidate images at once from the candidate images. In a case where one or more candidate images are selected, a button 88 of "add and lay out selected photos" is valid.

Subsequently, in a case where the user taps the valid button 88 of the "add and lay out selected photos", the selected candidate images are automatically laid out on the page spread 80 being edited. The selected candidate images become the additional images, the red borders disappear, and the selected candidate images are displayed in bluish purple.

As stated above, the user can select and add the candidate images desired to be added to the page spread 80 being edited by the user from the candidate images. A case where the layout of the page is edited is not limited to a case where the image is added to the page being edited, for example, various kinds of editing such as rotating of a frame of the image, rotating and cropping of the photo, deleting of the photo from the page being edited, and replacing of an arrangement position of the photo in the page can be performed.

Although the layout of the combination image is created by the server 12 in the case of the present embodiment, the layout is not limited thereto, and the layout of the combination image may be created on the first terminal device 14.

In this case, the image analysis unit of the first terminal device 14 analyzes the image group, the use image selection unit selects the use images from the image group based on the analysis result of the image group, the layout creation unit creates the layout of the combination image by using the use images and the information on the combination image, and the image display unit displays the combination image of which the layout is automatically created. The information storage unit of the server 12 stores the information on the layout transmitted from the first terminal device 14.

Since the image group includes more information than the image group for analysis, the layout can be created based on a more accurate analysis result than the analysis of the image group for analysis by analyzing the image group.

Similarly to a case where the layout is created on the server 12, in a case where the layout is created on the first terminal device 14, the image analysis unit of the first terminal device 14 can calculate the score of the each image included in the image group as the analysis result of the image group, and the candidate image selection unit can select, as the candidate images, the images of which the scores are equal to or higher than the predetermined reference value or the images of which the score is in a predetermined percentage in descending order from the image group other than the use images.

The image analysis unit of the first terminal device 14 can analyze the attributes of each image included in the image group, and the candidate image selection unit can select, as the candidate images, images of which attributes match the attributes of the additional image and images of which attributes are in a predetermined range from the attributes of the additional image from the image group other than the use images or select, as the candidate images, images of which attributes do not match the attributes of the additional image and attributes are out of the predetermined range from the attributes of the additional image.

In the case of the present embodiment, the candidate images are selected from the image group on the first terminal device 14, but this example is also not limited.

For example, the candidate image selection unit of the server 12 may select the candidate image for analysis from the image group for analysis other than the use images for analysis, and the candidate image selection unit of the first terminal device 14 may select the candidate images corresponding to the candidate images for analysis transmitted from the server 12 and received on the first terminal device 14 from the image group.

A timing at which the use images and the candidate images are transmitted from the first terminal device 14 to the server 12 is not particularly limited as long as the layout is automatically generated.

For example, at least some images included in the group including the use images and the candidate images may be transmitted from the first terminal device 14 to the server 12 in real time in the background while the layout is being edited on the first terminal device 14. In a case where all the images included in the group cannot be transmitted while the layout is being edited and after the layout is edited on the first terminal device 14, the remaining images included in the group, the additional images, and the information on the edited layout are transmitted from the first terminal device 14 to the server 12 according to the instruction from the user.

As stated above, not only the candidate images but also the use images are transmitted to the server 12 while the layout is being edited on the first terminal device 14, and thus, a transmission time for the user to experience to transmit the use images can be significantly further reduced than in a case where a dedicated time in which the use images are transmitted to the server 12 is set after the layout is edited and the use images are transmitted to the server 12.

Alternatively, not while the layout is being edited, but after the layout is edited on the first terminal device 14, the use images, the candidate images, the additional images, and the information on the edited layout may be transmitted to the server 12 from the first terminal device 14 according to the instruction from the user.

In response to the notification transmitted from the second terminal device 16 and received by the first terminal device 14, images corresponding to information on images other than the use images, the candidate images, and the additional images in the image group, which is included in the notification may be transmitted, as the candidate images, from the first terminal device 14 to the server 12.

In a case where the first terminal device 14 is a smartphone and the second terminal device 16 is a PC, a notification, including information on an image desired to be used for the combination image by the user is transmitted from the PC to the smartphone. For example, in a case where the user clicks on an image displayed in gray indicating that the image unavailable for the combination image while the layout is being edited on the PC, a notification including information on the clicked image is transmitted to the smartphone.

The user usually carries the smartphone and powers on the smartphone. In a case where the notification is transmitted from the PC to the smartphone, an unused image corresponding to the information on the image included in the notification is transmitted, as the candidate image, from the image group to the server 12 from the smartphone, on the smartphone. This unused image is transmitted from the server 12 and received by the smartphone in a case where the layout is edited on the smartphone.

Accordingly, the user can use even the unused image that is not selected as the candidate image for the combination image.

On the image processing apparatus 10, the user can input instructions to designate an image desired to be included in the combination image and an image desired not to be included in the combination image. In a case where the instruction to designate the image desired to be included in the combination image is input, the layout creation unit 28 creates the layout by using the image corresponding to this instruction for the combination image. In a case where the instruction to designate the image desired not to be included in the combination image is input, the layout creation unit 28 creates the layout without using the image corresponding to this instruction for the combination image.

Accordingly, it is possible to automatically create the combination image that includes the image desired to be included by the user and does not include the image desired not to be included from the image group. Thus, the user does not need to perform an editing work of adding the image desired to be included to the combination image or deleting the image desired not to be included from the combination image.

In a case where the editing of the layout is restarted on the second terminal device 16, it is not essential that the user inputs information that designates the combination image for which the editing of the layout is desired to be restarted.

For example, based on login information (account name, password, and the like) in a case where the user logs in to the server 12, in a case where the user logs in to the server 12 from the second terminal device 16 by using the same login information as in a case where the user logs in to the server 12 from the first terminal device 14, the information on the layout may be automatically acquired from the server 12. Alternatively, after the user logs in to the server 12 from the second terminal device 16 by using the same login information as in a case where the user logs in to the server 12 from the first terminal device 14, the user may acquire the information on the layout from the server 12 in a case where the user taps "edit restart button" displayed on the input screen.

Information on a media access control (MAC) address of the first terminal device 14 may be acquired in a case where the user logs in to the server 12 from the first terminal device 14, and the information on the layout may be automatically acquired from the server 12 in a case where the user logs in to the server 12 from the second terminal device 16 by using the same login information.

The images for analysis corresponding to the use images, the images for analysis corresponding to the candidate images, and the images for analysis corresponding to the additional images which are stored in the analysis image group storage unit 22 may be transmitted from the server 12 and received by the second terminal device 16 instead of the use images, the candidate images, and the additional images stored in the information storage unit 30, and the image group for analysis may be displayed, as the images available for the combination image, on the second terminal device 16 instead of the original image group.

As stated above, the images for analysis are transmitted in a case where the editing of the layout is restarted on the second terminal device 16, and thus, the waiting time of the user until the image group available for the combination image is transmitted can be significantly further reduced than in a ease where the original images are transmitted.

Although a case where the first terminal device 14 is the PC and the second terminal device 16 is the smartphone has been described as an example in the above embodiment, the present invention is not limited thereto. The same is true of a case where the first terminal device 14 is a smartphone and the second terminal device 16 is a PC, a ease where both the first and second terminal devices 14 and 16 are PCs or smartphones, a ease where the first and second terminal devices 14 and 16 are terminal devices other than the PC and the smartphone.

In the device according to the embodiment of the present invention, for example, the following various processors can be used as a hardware configuration of processing units that execute various kinds of processing such as the analysis image group storage unit 22, the image analysis unit 24, the use image selection unit 26, the layout creation unit 28, the instruction acquisition units 36 and 56, the analysis image group creation unit 42, the layout editing units 44 and 64, and the candidate image selection unit 46 may be dedicated hardware, or may be various processors or computers that execute programs.

The reception units 20, 34, and 54 and the transmission units 32, 48, and 68 are communication devices (reception circuits and transmission circuits) that receive and transmit various kinds of data, such as network interface circuits, modems, and routers.

The information storage unit 30 and the image storage unit 38 are constituted by, for example, a memory device such as a semiconductor memory, a storage device such as a hard disk drive (HDD) and a solid state drive (SSD), and the like.

The image display units 40 and 60 are, for example, image display devices such as a liquid crystal display and an organic electronic luminescent (EL) display.

Various processors include a central processing unit (CPU) which is a general-purpose processor that functions as various processing units by executing software (program), a programmable logic device (PLD), which is a processor capable of changing a circuit configuration after manufacture, such as a field programmable gate array (FPGA), and a dedicated electric circuit, which is a processor having a circuit configuration specifically designed in order to perform specific processing such as an application specific integrated circuit (ASIC).

One processing unit may be constituted by one of these various processors; or may be constituted by a combination of two or more processors of the same type or different types, for example, a combination of a plurality of FPGAs or a combination of a CPU and an FPGA. The plurality of processing units may be constituted by one of the various processors or may be constituted by using one processor obtained by combining two or more of the plurality of processing units.

The processor can be provided in any location. For example, the processor may be provided in the server 12, any of the terminal devices of the user including the first and second terminal devices 14 and 16, or each of these devices. In a case where there are a plurality of processors, these processors may cooperate with each other.

For example, one processor is constituted by a combination of one or more CPUs and software as represented by computers such as servers and terminal devices, and this processor functions as the plurality of processing units, A processor that realizes the functions of the entire system including the plurality of processing units via one integrated circuit (IC) chip is used as represented by a system on chip (SoC).

A hardware configuration of these various processors is an electric circuitry in which circuit elements such as semiconductor elements are combined.

For example, a method according to the embodiment of the present invention can be implemented by a program causing a computer to execute steps. It is possible to provide a computer-readable recording medium having the program recorded thereon.

While the present invention has been described in detail, the present invention is not limited to the embodiment, and may be modified and change in various manners without departing the gist of the present invention.

EXPLANATION OF REFERENCES

10: image processing apparatus
12: server

14: first terminal device
16: second terminal device
18: network (communication line)
20, 34, 54: reception unit
22: analysis image group storage unit
24: image analysis unit
26: use image selection unit
28: layout creation unit
30: information storage unit
32, 48, 68: transmission unit
36, 56: instruction acquisition unit
38: image storage unit
40, 60: image display unit
42: analysis image group creation unit
44, 64: layout editing unit
46: candidate image selection unit
70, 80: page spread being edited
72: edit menu
74: list of thumbnail images on pages of photo album
76, 86: list of thumbnail images of images
82: main menu
84: submenu
88: button.

What is claimed is:

1. An image processing apparatus that includes a server, a first terminal device, and a second terminal device different from the first terminal device which are connected via a network, the image processing apparatus comprising:
a processor,
wherein the processor is configured to:
create, from an image group of the first terminal device, an analysis image group on the first terminal device, such that each image for analysis included in the analysis image group has:
a resolution equal to or lower than a resolution of each corresponding image included in the image group,
at least a minimum resolution that is required for analysis, and
a smaller amount of data than each corresponding image included in the image group,
transmit the analysis image group from the first terminal device to the server,
analyze first images selected from the analysis image group,
create a layout of a combination image by using the first images,
store information on the layout on the server,
transmit the information on the layout from the server to the first terminal device,
display the layout of the combination image based on the information on the layout on the first terminal device,
select candidate images available for editing of the layout of the combination image in a case where the editing of the layout is restarted on the second terminal device from the image group based on a selection reference which is a reference to select the candidate images while the layout is being edited on the first terminal device, the candidate images being some images other than the first images, and
transmit the first images, the candidate images, and at least one additional image which is newly added to the combination image by a user from the image group other than the first images on the first terminal device from the first terminal device to the server and store the first images, the candidate images and the at least one additional image on the server,
wherein the selection reference includes a score of each image for analysis included in the analysis image group, and
wherein the processor is further configured to:
calculate the score of each image for analysis included in the analysis image group on the server,
transmit the score from the server to the first terminal device, and
select, as one of the candidate images, an image included in the image group and corresponding to an image for analysis of which the score is equal to or greater than a predetermined reference value or an image included in the image group and corresponding to an image for analysis of which the score is included in a predetermined percentage range from an image with a highest score, from the image group other than the first images, on the first terminal device.

2. The image processing apparatus according to claim 1, wherein the selection reference includes an attribute of each image for analysis included in the analysis image group, and
wherein the processor is configured to
analyze at least one of a capturing date and a capturing location as the attribute of each image for analysis included in the analysis image group on the server, and
transmit the attribute from the server to the first terminal device, select, as the candidate images, an image included in the image group and corresponding to an image for analysis of which the attribute matches an attribute of the at least one additional image and an image included in the image group and corresponding to an image for analysis of which the attribute is in a predetermined range from the attribute of the at least one additional image or select, as one of the candidate images, an image included in the image group and corresponding to an image for analysis of which the attribute does not match the attribute of the at least one additional image and the attribute is out of the predetermined range from the attribute of the at least one additional image, from the image group other than the first images, on the first terminal device.

3. The image processing apparatus according to claim 1, wherein the selection reference includes candidate images for analysis which are some images for analysis other than the first images for analysis, and
wherein the processor is configured to
select the candidate images for analysis from the analysis image group, and
transmit the candidate images for analysis from the server to the first terminal device, select the candidate images corresponding to the candidate images for analysis, from the image group, on the first terminal device.

4. The image processing apparatus according to claim 1, wherein the processor is configured to
transmit images for analysis corresponding to the first images, images for analysis corresponding to the candidate images, and at least one image for analysis corresponding to the at least one additional image from the server to the second terminal device, in a case where the editing of the layout is restarted on the second terminal device,
display, as images available for editing of the layout of the combination image, images for analysis corresponding to the first images and at least one image for analysis corresponding to the at least one additional image, in addition to images for analysis corresponding to the candidate images, while the layout is being edited on the second terminal device, on the second terminal device.

5. The image processing apparatus according to claim 1, wherein the selection reference includes information about an editing operation image on which an editing operation is performed by the user, and
wherein the processor is configured to
select, as one of the candidate images, an image on which an editing operation is performed by the user while the layout is being edited on the first terminal device and which is not used for the combination image after the layout is edited on the first terminal device from the image group other than the first images based on the information about an editing operation image on which an editing operation is performed by the user, on the first terminal device.

6. The image processing apparatus according to claim 1, wherein the selection reference includes a past order history of the user, and
wherein the processor is configured to
select the candidate images based on the past order history of the user from the image group other than the first images on the first terminal device.

7. The image processing apparatus according to claim 1, wherein the processor is configured to
transmit, as the candidate images, a predetermined number of images selected from the image group or images of a predetermined percentage in the image group from the first terminal device to the server.

8. The image processing apparatus according to claim 1, wherein the processor is configured to
transmit, as the candidate images, the number of images corresponding to at least one of a type of the network and a communication speed of the network, the number of images being selected from the image group, from the first terminal device to the server.

9. The image processing apparatus according to claim 1, wherein the processor is configured to
transmit at least some images included in a group including the first images and the candidate images from the first terminal device to the server while the layout is being edited on the first terminal device.

10. The image processing apparatus according to claim 1, wherein the selection reference includes a notification including information on an image desired to be used for the combination image by the user, and
wherein the processor is configured to
transmit the notification from the second terminal device to the first terminal device, transmit, as one of the candidate images, an image included in the image group and corresponding to the information on the image other than the first images, the candidate images, and the at least one additional image from the first terminal device to the server in response to the notification.

11. The image processing apparatus according to claim 1, wherein the processor is configured to
transmit the first images, the candidate images, and the at least one additional image from the server to the second terminal device, in a case where the editing of the layout is restarted on the second terminal device,
display, as images available for editing the layout of the combination image, the first images and the at least one additional image in addition to the candidate images, while the layout is being edited on the second terminal device, on the second terminal device.

12. An image processing method in an image processing apparatus that includes a server, a first terminal device, and a second terminal device different from the first terminal device which are connected via a network, the image processing method comprising:
creating, by an analysis image group creation unit of the first terminal device, from an image group of the first terminal device, an analysis image group, such that each image for analysis included in the analysis image group has:
a resolution equal to or lower than a resolution of each corresponding image included in the image group,
at least a minimum resolution that is required for analysis, and
a smaller amount of data than each corresponding image included in the image group;
transmitting, by a transmission unit of the first terminal device, the analysis image group from the first terminal device to the server;
analyzing, by an image analysis unit of the server, first images selected from the analysis image group;
creating, by a layout creation unit of the server, a layout of a combination image by using the first images;
storing, by an information storage unit of the server, information on the layout;
transmitting, by a transmission unit of the server, the information on the layout from the server to the first terminal device;
displaying, by an image display unit of the first terminal device, the layout of the combination image based on the information on the layout;
selecting, by a candidate image selection unit of the first terminal device, candidate images available for editing of the layout of the combination image in a case where the editing of the layout is restarted on the second terminal device, from the image group based on a selection reference which is a reference to select the candidate images while the layout is being edited on the first terminal device, the candidate images being some images other than the first images;
transmitting, by the transmission unit of the first terminal device, the first images, the candidate images, and at least one additional image which is newly added to the combination image by the user from the image group other than the first images on the first terminal device to the server; and
storing, by the information storage unit of the server, the first images, the candidate images and the at least one additional image,
wherein the selection reference includes a score of each image for analysis included in the analysis image group, and
wherein the image processing method further comprises:
calculating, by the image analysis unit of the server, the score of each image for analysis included in the analysis image group on the server,
transmitting, by the transmission unit of the server, the score from the server to the first terminal device, and
selecting, by the candidate image selection unit of the first terminal device, as one of the candidate images, an image included in the image group and corresponding to an image for analysis of which the score is equal to or greater than a predetermined reference value or an image included in the image group and corresponding to an image for analysis of which the score is included in a predetermined percentage range from an image with a highest score, from the image group other than the first images, on the first terminal device.

13. A non-transitory computer-readable recording medium having a program causing a computer to execute an image processing method in an image processing apparatus that includes a server, a first terminal device, and a second terminal device different from the first terminal device which are connected via a network recorded thereon, the image processing method comprising:
- creating from an image group of the first terminal device, an analysis image group on the first terminal device, such that each image for analysis included in the analysis image group has:
  - a resolution equal to or lower than a resolution of each corresponding image included in the image group,
  - at least a minimum resolution that is required for analysis, and
  - a smaller amount of data than each corresponding image included in the image group;
- transmitting the analysis image group from the first terminal device to the server;
- analyzing first images selected from the analysis image group;
- creating a layout of a combination image by using the first images;
- storing information on the layout on the server;
- transmitting the information on the layout from the server to the first terminal device;
- displaying the layout of the combination image based on the information on the layout on the first terminal device;
- selecting candidate images available for editing of the layout of the combination image in a case where the editing of the layout is restarted on the second terminal device, from the image group based on a selection reference which is a reference to select the candidate images while the layout is being edited on the first terminal device, the candidate images being some images other than the first images;
- transmitting the first images, the candidate images, and at least one additional image which is newly added to the combination image by the user from the image group other than the first images on the first terminal device from the first terminal device to the server; and
- storing the first images, the candidate images and the at least one additional image on the server, wherein the selection reference includes a score of each image for analysis included in the analysis image group, and wherein the image processing method further comprises:

calculating the score of each image for analysis included in the analysis image group on the server, transmitting the score from the server to the first terminal device, and selecting, as one of the candidate images, an image included in the image group and corresponding to an image for analysis of which the score is equal to or greater than a predetermined reference value or an image included in the image group and corresponding to an image for analysis of which the score is included in a predetermined percentage range from an image with a highest score, from the image group other than the first images, on the first terminal device.

* * * * *